US009829614B2

(12) United States Patent
Smith et al.

(10) Patent No.: US 9,829,614 B2
(45) Date of Patent: Nov. 28, 2017

(54) OPTICAL SENSOR USING COLLIMATOR

(71) Applicant: Synaptics Incorporated, San Jose, CA (US)

(72) Inventors: Patrick Smith, San Jose, CA (US); Paul Wickboldt, San Jose, CA (US); Patrick A Worfolk, San Jose, CA (US); Steve Molesa, San Jose, CA (US); Young Lee, San Jose, CA (US); Richard Klenkler, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 27 days.

(21) Appl. No.: 14/871,810

(22) Filed: Sep. 30, 2015

(65) Prior Publication Data
US 2016/0224816 A1  Aug. 4, 2016

Related U.S. Application Data

(60) Provisional application No. 62/111,012, filed on Feb. 2, 2015, provisional application No. 62/111,022, filed on Feb. 2, 2015.

(51) Int. Cl.
*G06K 9/00* (2006.01)
*G02B 5/20* (2006.01)
(Continued)

(52) U.S. Cl.
CPC ............. *G02B 5/208* (2013.01); *G02B 27/30* (2013.01); *G02B 27/58* (2013.01); *G06K 9/0004* (2013.01)

(58) Field of Classification Search
CPC ........ G02B 27/30; G02B 27/58; G02B 5/208; G06K 9/0004; H01L 27/14625;
(Continued)

(56) References Cited

U.S. PATENT DOCUMENTS 5,446,290 A  8/1995 Fujieda et al.
5,726,443 A  3/1998 Immega et al.
(Continued)

FOREIGN PATENT DOCUMENTS

CN  101814125 A  8/2010
CN  101814126 B  8/2010
(Continued)

OTHER PUBLICATIONS

Cho, et al, "Embedded Nano-Si Optical Sensor in TFT-LCDs Technology and Integrated as Touch-Input Display" *Digest of Technical Papers.* vol. 42. No. 1., 2011, pp. 1818-1821.
(Continued)

*Primary Examiner* — Bhavesh Mehta
*Assistant Examiner* — Ian Lemieux
(74) *Attorney, Agent, or Firm* — Leydig, Voit & Mayer, Ltd.

(57) ABSTRACT

Systems and methods for optical imaging are disclosed. The optical fingerprint sensor includes an image sensor array; a collimator filter layer disposed above the image sensor array, the collimator filter layer having an array of apertures; and an illumination layer disposed above the collimator filter layer. The collimator filter layer filters reflected light such that only certain of the reflected light beams reach optical sensing elements in the image sensor array. Employing the collimator filter layer prevents blurring while allowing for a lower-profile image sensor.

20 Claims, 6 Drawing Sheets

(51) Int. Cl.
*G02B 27/58* (2006.01)
*G02B 27/30* (2006.01)

(58) Field of Classification Search
CPC ......... H01L 27/14632; H01L 27/14685; H01L 27/14687
See application file for complete search history.

(56) References Cited

U.S. PATENT DOCUMENTS

| | | | |
|---|---|---|---|
| 5,991,467 A | 11/1999 | Kamiko | |
| 6,128,399 A | 10/2000 | Calmel | |
| 7,465,914 B2 | 12/2008 | Eliasson et al. | |
| 7,535,468 B2 | 5/2009 | Uy | |
| 7,728,959 B2* | 6/2010 | Waldman | G06K 9/00046 356/71 |
| 8,204,283 B2 | 6/2012 | Wu | |
| 8,204,284 B2 | 6/2012 | Wu | |
| 8,259,168 B2 | 9/2012 | Wu et al. | |
| 8,391,569 B2 | 3/2013 | Wu | |
| 8,520,912 B2 | 8/2013 | Wu et al. | |
| 8,570,303 B2 | 10/2013 | Chen | |
| 8,649,001 B2 | 2/2014 | Wu et al. | |
| 8,798,337 B2 | 8/2014 | Lei et al. | |
| 8,903,140 B2 | 12/2014 | Wu | |
| 8,917,387 B1 | 12/2014 | Lee et al. | |
| 8,921,473 B1* | 12/2014 | Hyman | C08K 3/04 423/445 R |
| 9,177,190 B1 | 11/2015 | Chou et al. | |
| 9,208,394 B2 | 12/2015 | Di Venuto Dayer et al. | |
| 2002/0054394 A1 | 5/2002 | Sasaki et al. | |
| 2003/0090650 A1 | 5/2003 | Fujieda | |
| 2004/0252867 A1 | 12/2004 | Lan et al. | |
| 2006/0113622 A1 | 6/2006 | Adkisson et al. | |
| 2006/0152615 A1 | 7/2006 | Kwon et al. | |
| 2008/0121442 A1 | 5/2008 | Boer et al. | |
| 2008/0237766 A1 | 10/2008 | Kim | |
| 2010/0067757 A1* | 3/2010 | Arai | G06K 9/0004 382/128 |
| 2010/0172552 A1 | 7/2010 | Wu | |
| 2010/0183200 A1 | 7/2010 | Wu | |
| 2010/0204064 A1 | 8/2010 | Cho | |
| 2010/0208952 A1 | 8/2010 | Wu | |
| 2010/0208954 A1 | 8/2010 | Wu | |
| 2010/0283756 A1 | 11/2010 | Ku et al. | |
| 2011/0122071 A1* | 5/2011 | Powell | G06F 3/0412 345/173 |
| 2011/0233383 A1* | 9/2011 | Oku | H01L 27/14625 250/208.1 |
| 2012/0076370 A1 | 3/2012 | Lei et al. | |
| 2012/0105614 A1 | 5/2012 | Wu et al. | |
| 2012/0321149 A1 | 12/2012 | Carver et al. | |
| 2012/0328170 A1 | 12/2012 | Wu et al. | |
| 2013/0034274 A1 | 2/2013 | Wu et al. | |
| 2013/0051635 A1 | 2/2013 | Wu et al. | |
| 2013/0119237 A1 | 5/2013 | Raguin et al. | |
| 2013/0120760 A1* | 5/2013 | Raguin | G01B 11/24 356/612 |
| 2013/0169780 A1 | 7/2013 | Wu | |
| 2013/0222282 A1 | 8/2013 | Huang et al. | |
| 2014/0125788 A1 | 5/2014 | Wu | |
| 2014/0218327 A1* | 8/2014 | Shi | G06F 3/041 345/174 |
| 2014/0355846 A1* | 12/2014 | Lee | G06K 9/0004 382/124 |
| 2015/0062088 A1 | 3/2015 | Cho et al. | |
| 2015/0078633 A1 | 3/2015 | Hung | |
| 2015/0187827 A1 | 7/2015 | Tu et al. | |
| 2015/0331508 A1 | 11/2015 | Nho et al. | |
| 2015/0347812 A1 | 12/2015 | Lin | |
| 2015/0347813 A1 | 12/2015 | Tsen | |
| 2015/0369661 A1 | 12/2015 | Lin | |
| 2015/0371074 A1 | 12/2015 | Lin | |
| 2015/0371075 A1 | 12/2015 | Lin | |
| 2016/0132712 A1 | 5/2016 | Yang et al. | |
| 2016/0247010 A1 | 8/2016 | Huang et al. | |

FOREIGN PATENT DOCUMENTS

| | | |
|---|---|---|
| CN | 202632318 U | 12/2010 |
| CN | 102073860 A | 5/2011 |
| CN | 102467660 A | 5/2012 |
| CN | 102682280 A | 9/2012 |
| CN | 202443032 U | 9/2012 |
| CN | 102842026 A | 12/2012 |
| CN | 102915430 A | 2/2013 |
| CN | 102955936 A | 3/2013 |
| CN | 101814126 A | 4/2013 |
| CN | 103198289 A | 7/2013 |
| CN | 103810483 A | 5/2014 |
| CN | 103942537 A | 7/2014 |
| CN | 104035620 A | 9/2014 |
| CN | 104063704 A | 9/2014 |
| CN | 203838722 U | 9/2014 |
| CN | 104182727 A | 12/2014 |
| CN | 204028936 U | 12/2014 |
| CN | 104463074 A | 3/2015 |
| CN | 102915430 B | 8/2015 |
| CN | 102955936 B | 9/2015 |
| EP | 2437201 A2 | 4/2012 |
| EP | 2437201 A3 | 4/2012 |
| EP | 2447883 A1 | 5/2012 |
| EP | 2555137 A1 | 2/2013 |
| EP | 2562683 A1 | 2/2013 |
| JP | 3177550 U | 8/2012 |
| KR | 20120003165 U | 5/2012 |
| KR | 200462271 Y1 | 9/2012 |
| KR | 20130016023 A | 2/2013 |
| KR | 20130022364 A | 3/2013 |
| KR | 101259310 B1 | 5/2013 |
| KR | 101307002 B1 | 9/2013 |
| TW | 201214303 A1 | 4/2010 |
| TW | 201027436 A | 7/2010 |
| TW | 201032145 A1 | 9/2010 |
| TW | 201115479 A1 | 5/2011 |
| TW | M435680 U1 | 2/2012 |
| TW | 201301144 A1 | 1/2013 |
| TW | I82349 B1 | 1/2013 |
| TW | I382350 | 1/2013 |
| TW | I450201 B | 2/2013 |
| TW | 201310353 A1 | 3/2013 |
| TW | 201329872 A1 | 7/2013 |
| TW | 201419165 A | 5/2014 |
| TW | I444904 B | 7/2014 |
| TW | I448973 B | 8/2014 |
| TW | I457842 B | 10/2014 |
| TW | 201441940 A | 11/2014 |
| TW | I456510 B | 12/2014 |
| TW | 201308215 A1 | 2/2015 |
| TW | 201506807 A | 2/2015 |
| WO | WO 2015/041459 A1 | 3/2015 |
| WO | WO 2015/140600 A1 | 9/2015 |
| WO | 2016119492 † | 8/2016 |

OTHER PUBLICATIONS

Brown, et al., "A Continuous-Grain Silicon-System LCD With Optical Input Function" IEEE Journal of Solid-State Circuits, Dec. 12, 2007, vol. 42.
Atpina Technology White Paper "An Objective Look at FSI and BSI" May 18, 2010, 6 pages.
Durini, "High Performance Silicon Imaging: Fundamentals and Applications of CMOS and CCD Sensors" *Woodhead Publishing Series in Electronic and Optical Materials* 1$^{st}$ edition; May 8, 2014, pp. 98-107.
International Search Report and Written Opinion of the International Searching Authority for PCT/US2016/055574 dated Jan. 10, 2017.
Rowe et al. "Multispectral Fingerprint Image Acquisition" Springer, New York, USA, 2008 pp. 3-23.

(56) References Cited

OTHER PUBLICATIONS

VKANSEE Presentation prior to Sep. 30, 2015.
English translation of CN102073860 submitted with Third Party Submission under 37 CFR 1.290 in U.S. Appl. No. 15/280,623, dated Sep. 28, 2017.

\* cited by examiner
† cited by third party

OPTICAL SENSOR USING COLLIMATOR

CROSS REFERENCE TO RELATED APPLICATIONS

This application claims the benefit of U.S. Provisional Patent Application Ser. No. 62/111,012, filed on Feb. 2, 2015.This application also claims the benefit of U.S. Provisional Patent Application Ser. No. 62/111,012, filed on Feb. 2, 2015, the entire contents of which are expressly incorporated by reference.

FIELD

This disclosure generally relates to optical sensors, and more particularly to an optical sensor using a collimator.

BACKGROUND

Object imaging is useful in a variety of applications. By way of example, biometric recognition systems image biometric objects for authenticating and/or verifying users of devices incorporating the recognition systems. Biometric imaging provides a reliable, non-intrusive way to verify individual identity for recognition purposes. Various types of sensors may be used for biometric imaging.

Fingerprints, like various other biometric characteristics, are based on distinctive personal characteristics and thus provide a reliable mechanism to recognize an individual. Thus, fingerprint sensors have many potential applications. For example, fingerprint sensors may be used to provide access control in stationary applications, such as security checkpoints. Fingerprint sensors may also be used to provide access control in mobile devices, such as cell phones, wearable smart devices (e.g., smart watches and activity trackers), tablet computers, personal data assistants (PDAs), navigation devices, and portable gaming devices. Accordingly, some applications, in particular applications related to mobile devices, may require recognition systems that are both small in size and highly reliable.

Most commercially available fingerprint sensors are based on optical or capacitive sensing technologies. Unfortunately, conventional optical fingerprint sensors are too bulky to be packaged in mobile devices and other common consumer electronic devices, confining their use to door access control terminals and similar applications where sensor size is not a restriction.

As a result, fingerprint sensors in most mobile devices are capacitive sensors having a sensing array configured to sense ridge and valley features of a fingerprint. Typically, these fingerprint sensors either detect absolute capacitance (sometimes known as "self-capacitance") or trans-capacitance (sometimes known as "mutual capacitance"). In either case, capacitance at each sensing element in the array varies depending on whether a ridge or valley is present, and these variations are electrically detected to form an image of the fingerprint.

While capacitive fingerprint sensors provide certain advantages, most commercially available capacitive fingerprint sensors have difficulty sensing fine ridge and valley features through large distances, requiring the fingerprint to contact a sensing surface that is close to the sensing array. It remains a significant challenge for a capacitive sensor to detect fingerprints through thick layers, such as the thick cover glass (sometimes referred to herein as a "cover lens") that protects the display of many smart phones and other mobile devices. To address this issue, a cutout is often formed in the cover glass in an area beside the display, and a discrete capacitive fingerprint sensor (often integrated with a mechanical button) is placed in the cutout area so that it can detect fingerprints without having to sense through the cover glass. The need for a cutout makes it difficult to form a flush surface on the face of device, detracting from the user experience, and complicating the manufacture. The existence of mechanical buttons also takes up valuable device real estate.

One possible solution for an optical based sensor is to use a pinhole type camera. A pinhole camera includes a thin light blocking layer with a small aperture. Light from an object on one side of the blocking layer passes through the aperture and is projected in an inverted fashion onto a detection surface disposed on the opposite side of the blocking layer. However, pinhole cameras suffer from certain disadvantages. For example, images collected from a pinhole camera arrangement are inverted and thus may require additional processing to be useful. Moreover, the vast amount of light from the object is blocked by the blocking layer and only a small amount of light is transmitted through the aperture. Thus, image quality may be an issue. Moreover, the area of the object imaged varies significantly as the distance between the blocking layer and the object to be imaged varies.

SUMMARY

One embodiment of the disclosure provides an optical fingerprint sensor. The optical fingerprint sensor includes an image sensor array; a collimator filter layer disposed above the image sensor array, the collimator filter layer having an array of apertures; and an illumination layer disposed above the collimator layer.

Another embodiment of the disclosure provides an optical fingerprint sensor. The optical fingerprint sensor includes an illumination layer configured to direct light to a sensing region; a collimating layer, disposed below the illumination layer, and including a plurality of apertures, wherein the apertures are configured to block a portion of light from the illumination layer; and an image sensor layer, disposed below the collimating layer, and including an array of optical sensor elements arranged so that a plurality of the sensor elements receive light transmitted through one of the plurality of apertures.

Yet another embodiment of the disclosure provides a method of imaging a fingerprint using a device. The method includes transmitting light in an illumination region such that at least a portion of light reflects from a sensing region; blocking at least a first portion of the light reflected from the sensing region at a surface of a collimating layer; blocking at least a second portion of the light reflected from the sensing region within a plurality of apertures of the collimating layer; and sensing, at a plurality of optical sensor elements in a sensor array, a third portion of light reflected from the sensing region, the third portion of light being passed through at least one of the plurality of apertures in the collimating layer.

DETAILED DESCRIPTION

The following detailed description is exemplary in nature and is not intended to limit the invention or the application and uses of the invention. Furthermore, there is no intention to be bound by any expressed or implied theory presented in the preceding technical field, background, summary, brief description of the drawings, or the following detailed description.

Turning to the drawings, and as described in greater detail herein, embodiments of the disclosure provide methods and systems to optically image an input object such as a fingerprint. In particular, a method and system is described wherein an optical sensor includes a collimator filter layer which operates as a light conditioning layer, interposed between a light illumination layer and an image sensor array. Transmitted light from the illumination layer reflects from an input object in a sensing region above a cover layer. The reflected light is filtered by the collimator filter layer such that only certain of the reflected light beams reach optical sensing elements in the image sensor array.

Employing the collimator filter layer of the present disclosure prevents blurring while allowing for a lower-profile image sensor, such as a fingerprint sensor, than is possible with purely lens-based or pinhole camera based imaging sensors. Thus, the image sensor can be made thin for use in mobile devices such as cell phones. Placing individual collimator apertures over each optical sensing element, or group of elements, provides better sensitivity than purely pinhole based imagers by transmitting more light to the optical sensing elements. The present disclosure describes the use of the collimator filter layer to enable optical sensing through a large range of thicknesses of cover layers.

Figure 1:
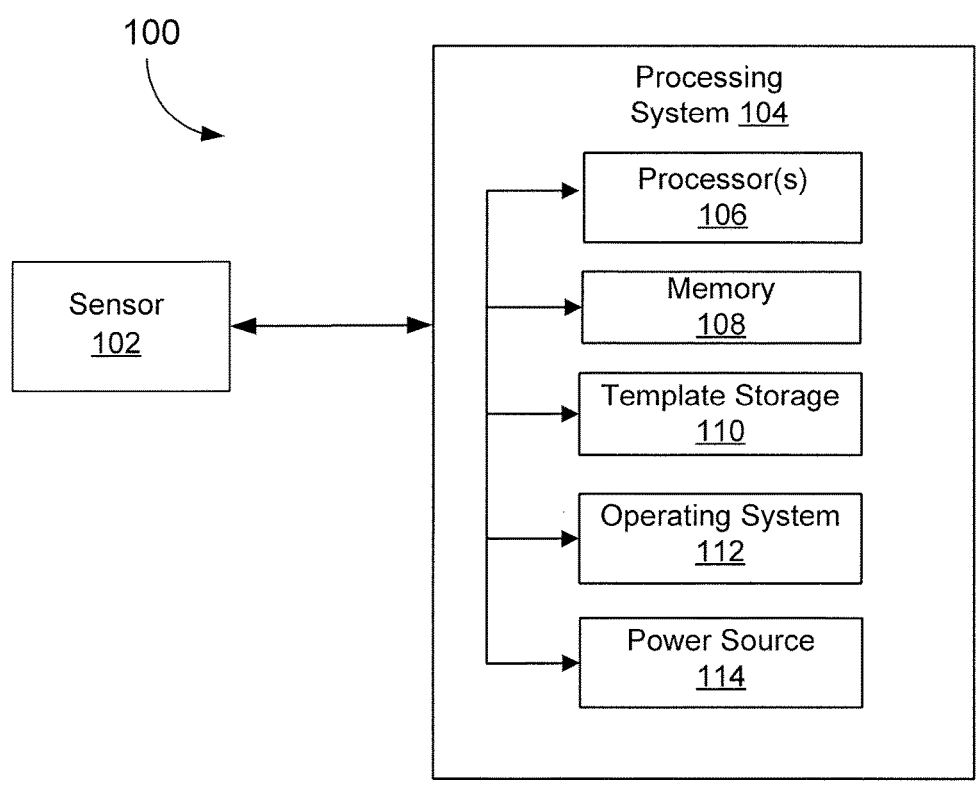
FIG. 1 is a block diagram of an example of a system that includes an optical sensor and a processing system, according to an embodiment of the disclosure.

FIG. 1 is a block diagram of an example of an electronic system 100 that includes an optical sensor device 102 and a processing system 104, according to an embodiment of the disclosure. By way of example, basic functional components of the electronic device 100 utilized during capturing, storing, and validating a biometric match attempt are illustrated. The processing system 104 includes a processor(s) 106, a memory 108, a template storage 110, an operating system (OS) 112, and a power source(s) 114. Each of the processor(s) 106, the memory 108, the template storage 110, and the operating system 112 are interconnected physically, communicatively, and/or operatively for inter-component communications. The power source 114 is interconnected to the various system components to provide electrical power as necessary.

As illustrated, processor(s) 106 are configured to implement functionality and/or process instructions for execution within electronic device 100 and the processing system 104. For example, processor 106 executes instructions stored in memory 108 or instructions stored on template storage 110 to identify a biometric object or determine whether a biometric authentication attempt is successful or unsuccessful. Memory 108, which may be a non-transitory, computer-readable storage medium, is configured to store information within electronic device 100 during operation. In some embodiments, memory 108 includes a temporary memory, an area for information not to be maintained when the electronic device 100 is turned off. Examples of such temporary memory include volatile memories such as random access memories (RAM), dynamic random access memories (DRAM), and static random access memories (SRAM). Memory 108 also maintains program instructions for execution by the processor 106.

Template storage 110 comprises one or more non-transitory computer-readable storage media. In the context of a fingerprint sensor, the template storage 110 is generally configured to store enrollment views for fingerprint images for a user's fingerprint or other enrollment information. More generally, the template storage 110 may be used to store information about an object. The template storage 110 may further be configured for long-term storage of information. In some examples, the template storage 110 includes non-volatile storage elements. Non-limiting examples of non-volatile storage elements include magnetic hard discs, solid-state drives (SSD), optical discs, floppy discs, flash memories, or forms of electrically programmable memories (EPROM) or electrically erasable and programmable (EEPROM) memories, among others.

The processing system 104 also hosts an operating system (OS) 112. The operating system 112 controls operations of the components of the processing system 104. For example, the operating system 112 facilitates the interaction of the processor(s) 106, memory 108 and template storage 110.

According to various embodiments, the processor(s) 106 implement hardware and/or software to obtain data describing an image of an input object. The processor(s) 106 may also align two images and compare the aligned images to one another to determine whether there is a match. The processor(s) 106 may also operate to reconstruct a larger image from a series of smaller partial images or sub-images, such as fingerprint images when multiple partial fingerprint images are collected during a biometric process, such as an enrollment or matching process for verification or identification.

The processing system 104 includes one or more power sources 114 to provide power to the electronic device 100. Non-limiting examples of power source 114 include single-use power sources, rechargeable power sources, and/or power sources developed from nickel-cadmium, lithium-ion, or other suitable material as well power cords and/or adapters which are in turn connected to electrical power.

Optical sensor 102 can be implemented as a physical part of the electronic system 100, or can be physically separate from the electronic system 100. As appropriate, the optical sensor 102 may communicate with parts of the electronic system 100 using any one or more of the following: buses, networks, and other wired or wireless interconnections. In some embodiments, optical sensor 102 is implemented as a fingerprint sensor to capture a fingerprint image of a user. In accordance with the disclosure, the optical sensor 102 uses optical sensing for the purpose of object imaging including imaging biometrics such as fingerprints. The optical sensor 102 can be incorporated as part of a display, for example, or may be a discrete sensor.

Some non-limiting examples of electronic systems 100 include personal computers of all sizes and shapes, such as desktop computers, laptop computers, netbook computers, tablets, web browsers, e-book readers, and personal digital assistants (PDAs). Additional example electronic systems 100 include composite input devices, such as physical keyboards and separate joysticks or key switches. Further example electronic systems 100 include peripherals such as data input devices (including remote controls and mice) and data output devices (including display screens and printers). Other examples include remote terminals, kiosks, video game machines (e.g., video game consoles, portable gaming devices, and the like), communication devices (including cellular phones, such as smart phones), and media devices (including recorders, editors, and players such as televisions, set-top boxes, music players, digital photo frames, and digital cameras).

The optical sensor 102 may provide illumination to the sensing region. Reflections from the sensing region in the illumination wavelength(s) are detected to determine input information corresponding to the input object.

The optical sensor 102 may utilize principles of direct illumination of the input object, which may or may not be in contact with a sensing surface of the sensing region depending on the configuration. One or more light sources and/or light guiding structures may be used to direct light to the sensing region. When an input object is present, this light is reflected from surfaces of the input object, which reflections can be detected by the optical sensing elements and used to determine information about the input object.

The optical sensor 102 may also utilize principles of internal reflection to detect input objects in contact with a sensing surface. One or more light sources may be used to direct light in a light guiding element at an angle at which it is internally reflected at the sensing surface of the sensing region, due to different refractive indices at opposing sides of the boundary defined by the sensing surface. Contact of the sensing surface by the input object causes the refractive index to change across this boundary, which alters the internal reflection characteristics at the sensing surface, causing light reflected from the input object to be weaker at portions where it is in contact with the sensing surface. Higher contrast signals can often be achieved if principles of frustrated total internal reflection (FTIR) are used to detect the input object. In such embodiments, the light may be directed to the sensing surface at an angle of incidence at which it is totally internally reflected, except where the input object is in contact with the sensing surface and causes the light to partially transmit across this interface. An example of this is presence of a finger introduced to an input surface defined by a glass to air interface. The higher refractive index of human skin compared to air causes light incident at the sensing surface at the critical angle of the interface to air to be partially transmitted through the finger, where it would otherwise be totally internally reflected at the glass to air interface. This optical response can be detected by the system and used to determine spatial information. In some embodiments, this can be used to image small scale fingerprint features, where the internal reflectivity of the incident light differs depending on whether a ridge or valley is in contact with that portion of the sensing surface.

Figure 2:
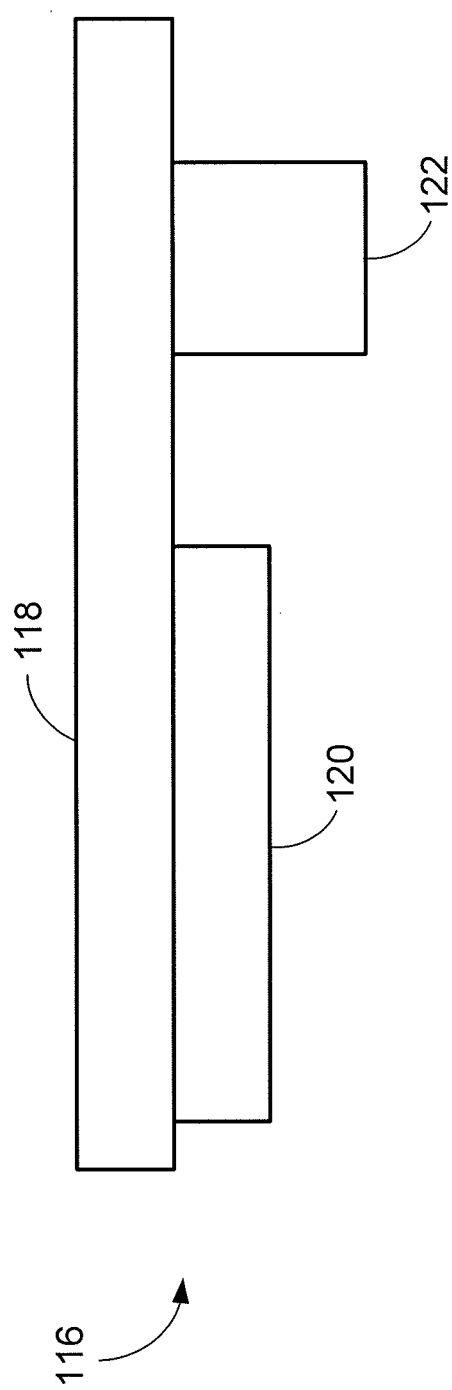
FIG. 2 illustrates an example of a mobile device that includes an optical sensor according to an embodiment of the disclosure.

FIG. 2 illustrates an example of a electronic device 116, such as a mobile phone, which includes cover glass 118 over a display 120. The disclosed method and system may be implemented by using the display 120 as the optical sensor to image an input object. Alternatively, a separate discrete component 122 provides the optical sensing capabilities. A discrete sensor may provide more flexibility in designing the optical components of the sensor for optimum illumination and/or signal conditioning than when attempting to integrate the optical sensor components on a display substrate, such as a TFT backplane.

Figure 3:
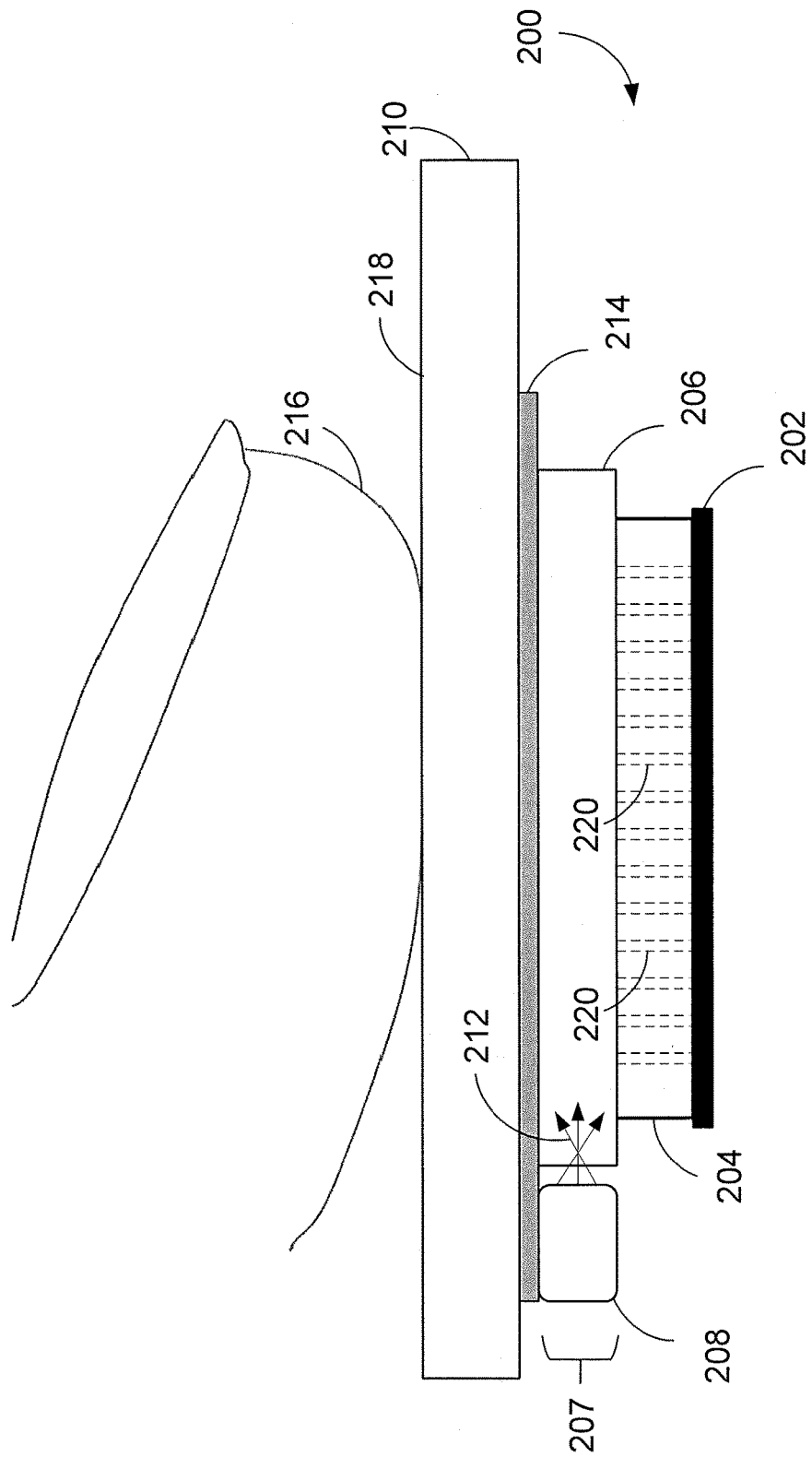
FIG. 3 illustrates an example of an optical sensor with a collimator filter layer according to an embodiment of the disclosure.

FIG. 3 illustrates an example of a stack-up for an optical image sensor device 200 used to image an object 216, such as a fingerprint. The sensor 200 includes an image sensor array 202, a collimator filter layer or light conditioning layer 204 disposed above the image sensor array 202, an illumination layer 207 disposed above the collimator filter layer 204, a light source 208, and a cover layer 210. In certain embodiments, a blocking layer 214 may also be provided.

The cover layer 210 protects the inner components of the sensor 200 such as the image sensor array 202. The cover layer 210 may include a cover glass or cover lens that protects inner components of a display in addition to the sensor 200. A sensing region for the input object is defined above the cover layer 210. A top surface 218 of the cover layer 210 may form a sensing surface, which provides a contact area for the input object 216 (e.g., fingerprint). The cover layer 210 is made of any material such as glass, transparent polymeric materials and the like.

Although generally described in the context of fingerprint for illustrative purposes, the input object 216 is any object to be imaged. Generally, the object 216 will have various features. By way of example, the object 216 has ridges and valleys. Due to their protruding nature, the ridges contact the sensing surface 218 of the cover 210 layer. In contrast, the valleys do not contact the sensing surface 218 and instead form an air gap between the input object 216 and the sensing surface 218. The object 216 may have other features such as stain, ink and the like that do not create significant structural differences in portions of the input object 216, but which affect its optical properties. The methods and systems disclosed herein are suitable for imaging such structural and non-structural features of the input object 216.

The illumination layer 207 includes a light source 208 and/or a light guiding element 206 that directs illumination to the sensing region in order to image the input object. As shown in FIG. 3, the light source 208 transmits beams or rays of light 212 into the light guiding element 206 and the transmitted light propagates through the light guiding element 206. The light guiding element may utilize total internal reflection, or may include reflecting surfaces that extract light up towards the sensing region. Some of the light in the illumination layer may become incident at the sensing surface 218 in an area that is contact with the input object 216. The incident light is in turn reflected back towards the collimator filter layer 204. In the example shown, the light source 208 is disposed adjacent to the light guiding element 206. However, it will be understood that the light source 208 may be positioned anywhere within the sensor 200 provided that emitted light reaches the light guiding element 206. For example, the light source 208 may be disposed below the image sensor array 202. Moreover, it will be understood that a separate light guiding element 206 is not required. For example, the light transmitted from the light source 208 can be transmitted directly into the cover layer 210 in which case the cover layer 210 also serves as the light guiding element. As another example, the light transmitted from the light source 208 can be transmitted directly to the sensing region, in which case the light source 208 itself serves as the illumination layer.

A discrete light source is also not required. For example, the method and system contemplate using the light provided by a display or the backlighting from an LCD as suitable light sources. The light provided by the illumination layer 207 to image the object 216 may be in near infrared (NIR) or visible. The light can have a narrow band of wavelengths, a broad band of wavelengths, or operate in several bands.

The image sensor array 202 detects light passing through the collimator filter layer 204. Examples of suitable sensor arrays are complimentary metal oxide semiconductor (CMOS) and charge coupled device (CCD) sensor arrays. The sensor array 202 includes a plurality of individual optical sensing elements capable of detecting the intensity of incident light.

To achieve optical sensing of fingerprints and fingerprint-sized features through thicker cover layers 210, light reflected from the fingerprint is conditioned by the light collimator filter layer 204 so that the light reaching a sensing element in the image sensor array 202 comes only from a small spot on the input object 216 directly above the sensor element. In the absence of such conditioning, any light arriving at a sensing element from a region on the object far away from the optical sensing elements contributes to image blurring.

To condition the light in accordance with the disclosure, the collimator filter layer 204 is provided with an array of apertures, or collimator holes, 220 with each aperture being directly above one or more optical sensing elements on the image sensor array 202. The apertures 220 are formed using any suitable technique, such as laser drilling, etching and the like.

The collimator filter layer 204 only allows light rays reflected from the input object 216 (e.g., finger) at normal or near normal incidence to the collimator filter layer 204 to pass and reach the optical sensing elements of the image sensor array 204. In one embodiment, the collimator filter layer 204 is an opaque layer with array of holes 220. The collimator filter layer 204 is laminated, stacked, or built directly above the image sensor array 202. By way of example, the collimator filter layer 204 may be made of plastics such as polycarbonate, PET, polyimide, carbon black, inorganic insulating or metallic materials, silicon, or SU-8. In certain embodiments, the collimator filter layer 204 is monolithic.

Also shown in FIG. 3 is blocking layer 214, which is optionally provided as part of optical sensor 200. The blocking layer 214 is a semitransparent or opaque layer that may be disposed above the collimator filter layer 204. By way of example, the blocking layer may be disposed between the cover layer 210 and the illumination layer 207, as shown in FIG. 3. Alternatively, the blocking layer 214 may be disposed between the illumination layer 207 and the collimator filter layer 204. In either case, the blocking layer 214 obscures components of the sensor 200, such as the apertures in the collimator filter layer, from ambient light illumination, while still allowing the sensor 200 to operate. The blocking layer 214 may include of a number of different materials or sub-layers. For example, a thin metal or electron conducting layer may be used where the layer thickness is less than the skin depth of light penetration in the visible spectrum. Alternately, the blocking layer 214 may include a dye and/or pigment or several dyes and/or pigments that absorb light, for example, in the visible spectrum. As yet another alternative, the blocking layer 214 may include several sub-layers or nano-sized features designed to cause interference with certain wavelengths, such as visible light for example, so as to selectively absorb or reflect different wavelengths of light. The light absorption profile of the blocking layer 214 may be formulated to give a particular appearance of color, texture, or reflective quality thereby allowing for particular aesthetic matching or contrasting with the device into which the optical sensor 200 is integrated. If visible illumination wavelengths are used, a semitransparent layer may be used to allow sufficient light to pass through the blocking layer to the sensing region, while still sufficiently obscuring components below.

Figure 4:
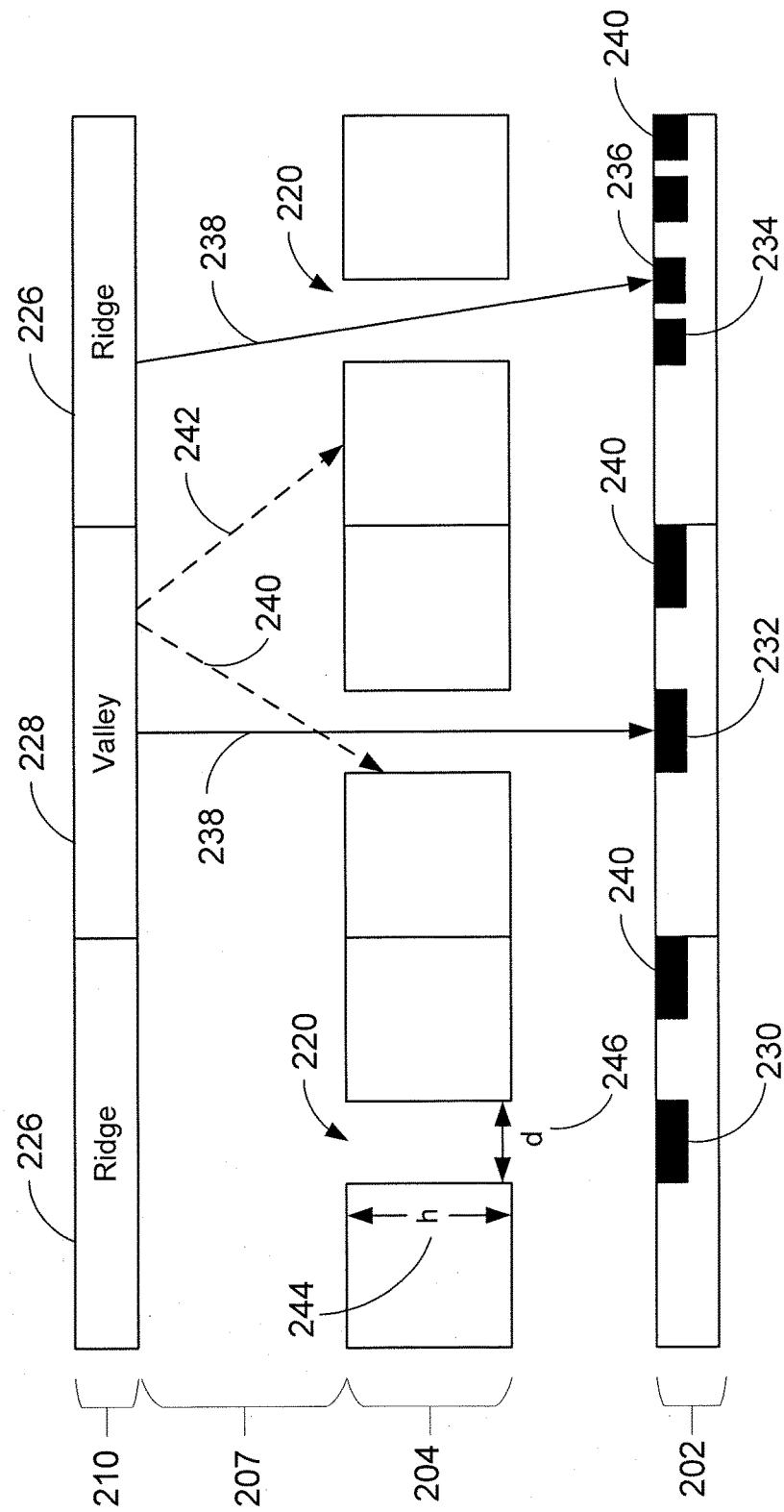
FIG. 4 illustrates an example of light interacting with an optical sensor having a collimator filter layer according to an embodiment of the disclosure.

FIG. 4 illustrates a closer view of the collimator filter layer 204 disposed between the illumination layer 207 and the image sensor array 202 and interaction of light within the sensor 200. Portions 226 of the cover layer 210 are in contact with ridges of the input object 216 and portion 228 of the cover layer 210 is in contact with air due to the presence of a valley of object 216. Image sensor array 202 includes optical sensing elements 230, 232, 234 and 236 disposed below apertures or holes 220 of the collimator filter layer 204.

Illustratively shown are a series of light rays reflected at the cover layer 210. For example, light rays 238 reflect from the cover layer 210 at portions occupied by ridges or valleys of the object 216. Because the light rays 238 are above collimator apertures 220 and are relatively near normal, the light rays 238 pass through the apertures 220 in the collimator filter layer 204 and become incident on optical sensing elements 232 and 236, for example. The optical sensing elements can then be used to measure the intensity of light and convert the measured intensity into image data of the input object 216. On the other hand, light beams 240 and 242, which have a larger angle from normal, strike the collimator filter layer 204, either on its top surface or at surface within the aperture (e.g., aperture sidewall) and are blocked and prevented from reaching optical sensing elements in the image sensor array 202.

A metric of the collimator filter layer 204 is an aspect ratio of the apertures or holes 220. The aspect ratio is the height of the holes (h) 244 in the collimator filter layer 204 divided by hole diameter (d) 246. The aspect ratio should be sufficiently large to prevent "stray" light from reaching the optical sensing elements directly under each collimator hole. An example of stray light is light ray 242 reflected from portion 228 of the cover layer 210 (e.g., a valley), which would reach sensing elements underneath a ridge in the absence of the collimator filter layer. Larger aspect ratios restrict the light acceptance cone to smaller angles, improving the optical resolution of the system. The minimum aspect ratio can be estimated using a ratio of the distance from the collimator filter layer 204 to the object being imaged (e.g., finger) divided by the desired optical resolution of the finger. In some embodiments, the collimator apertures 220 are cylindrical or conical in shape. The sidewalls of the collimator apertures 220 may include grooves or other structures to prevent stray light from reflecting off the walls and reaching the optical sensing elements. The effective aspect ratio is determined by the average hole diameter along height of the collimator holes. Examples of suitable aspect ratios are ratios in the range of about 3:1 to 100:1 and more typically in the range of about 5:1 to 20:1.

It is generally desirable to make the height 244 of the collimator apertures 220 as thin as possible to provide the most flexibility for fabricating the collimator filter layer 204 and integrating it with the underlying image sensor array 202, such as a CMOS or CCD image sensor. A small aperture diameter 246 may be used to maintain the desired collimator aspect ratio. However, if the aperture is made too small (less than a few times the wavelength of light being used), diffraction effects can contribute to additional blurring as the light rays exiting the collimator apertures 220 diverge. Such diffraction effects can be mitigated by placing the collimator filter layer 204 as close to the image sensor array 202 as possible, ideally much closer than the Fraunhofer far field distance (r^2/lambda, where r is the aperture radius and lambda is the light wavelength).

It is also generally desirable to minimize the distance between the collimator filter layer 204 and the image sensor array 202 to allow the light reaching the optical sensing elements of the image sensor array 202 to be as concentrated as possible. In addition, if this sensor array 202 to collimator filter layer 204 distance is too large, stray light from adjacent holes may reach a particular optical sensing element, contributing to image blurring.

If the image sensor array 202 is a CCD or CMOS image sensor, where the optical sensing element pitch (distance between elements) may be smaller than the collimator hole pitch (distance between holes), the light passing through a single collimator aperture 220 may illuminate more than one optical sensing element. Such an arrangement is shown by optical sensing elements 234 and 236 in FIG. 4. In such cases, the processing system (FIG. 1) may combine the light intensity recorded by all the optical sensing elements corresponding to a given collimator aperture. The resulting fingerprint image after processing raw data from the image sensor array 202 may have a resolution corresponding to the array of collimator apertures. It will be noted that the arrangement of apertures 220 in the collimator filter layer 204 may result in some optical sensing elements in the sensor array 202 going unused. Examples of an unused optical sensing elements are sensing elements 240. Because optical sensing elements 240 are not underneath a collimator hole, reflected rays will be blocked before reaching them. Image processing may remove the unused sensor elements and scale the image appropriately before the data is used in image reconstruction or image matching, for example.

The imaging resolution (in dpi) of the optical sensor 200 is defined by the resolution of the apertures 220 in the collimation filter layer 204 whereas the pitch is the distance between each aperture. In the optical sensor 200, each aperture 220 in the collimator filter layer 204 corresponds to a sample of a feature of the object 216 being imaged, such as a sample from a ridge or valley within a fingerprint. To maximize resolution, the sampling density (which is equal to the aperture density) should be large enough such that multiple samples are taken of each feature of interest. Thus, for example, to image ridges in a fingerprint, the pitch may be on the order of 50 to 100 microns since the pitch of the ridges themselves is on the order of 150 to 250 microns. If it desired to capture more granular features, such as pores in a fingerprint, a smaller pitch such as 25 microns would be appropriate. Conversely, a larger pitch can be used to capture larger features of the input object.

The optical sensor 200 performs similarly over a wide range of distances between the collimator filter layer 204 and the sensing surface 220 because the filtering of reflected light is generally thickness independent, as long as the aspect ratio of the holes in the collimator filter layer 204 is chosen to support the desired optical resolution.

Figure 5:
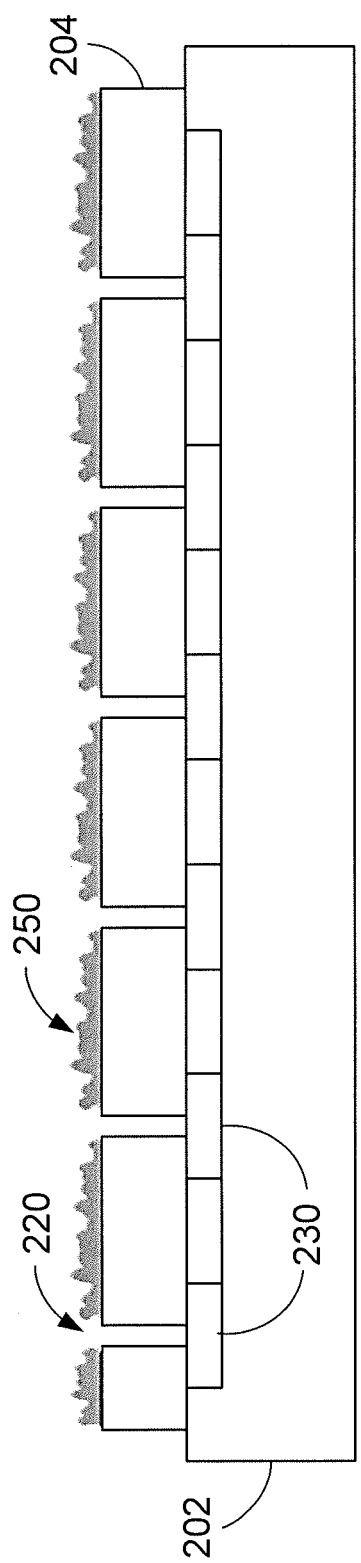
FIG. 5 illustrates an alternative embodiment of a collimator filter layer according to an embodiment of the disclosure

FIG. 5 shows an alternative embodiment of the collimator filter layer 204. As described above, the collimator filter layer 204 is made of light-absorbing materials and includes an array of apertures 220. In the alternative embodiment shown, the top surface of the collimator filter layer 204 further includes a reflecting layer 250. The reflecting layer 250 allows light beams which would normally be absorbed by the collimator filter layer 204 to be reflected back upwards towards the sensing region. Redirecting the light back to the sensing region allows the reflected light to be recycled so that some of the recycled light can be reflected off the input object to be imaged and transmitted through the collimator filter layer apertures.

Inclusion of the reflecting layer 250 minimizes light loss by reflecting the stray light back to the input object 216 without requiring a high level of illumination in the overall sensor package. The top of the light-absorbing collimator filter layer body may be roughened up using various texturizing techniques, including but not limited to, sandblasting, coating with fillers, UV embossing or dry etching. This roughened-up top may then covered with a thin layer of metal, which creates a surface that is multifaceted in a randomized fashion. The reflecting layer 250 may be made of any suitable material that will reflect light such as aluminum, chromium, and silver to name a few examples.

The method and system disclosed contemplate various ways to include the collimator filter layer 204 into the overall structure of the optical sensor 200. For example, the collimator filter layer 204 may be a pre-patterned structure that is laminated or stacked onto the image sensor array 202, as generally depicted in FIGS. 3-4. Alternative embodiments are contemplated by present disclosure. For example, one alternative embodiment is to pattern or create the collimator filter layer 204 directly onto a CMOS image sensor die or wafer, as generally depicted in FIG. 5. For example, a wafer-level collimator layer may be formed by microfabrication. Instead of placing a separate collimator filter layer 204 on top of the image sensor array 202, back-end processes are added to CMOS image sensor array fabrication. With this technique, no separate manufacturing of the collimator filter layer is required. On top of the CMOS image sensor array, liquid-type polymer resin with light-absorbing dyes such as carbon black may be coated first then cured to form the collimator filter layer body. After the polymer resin is cured, metal may be optionally sputtered onto the cured resin top to act as a reflective layer. The aperture pattern may be made through photolithography and etching of the metal and the polymer layer underneath subsequently to create the apertures. As a final step, the metal layer can be roughened up to create a reflecting/diffusing layer.

In yet another embodiment, the collimator filter layer 204 is replaced or supplemented with an optical interference filter that blocks "stray" light at angles of incidence that are relatively far from normal to the imaging plane. Multilayer optical filters can be used that transmit light at incidence near normal in much the same way such a filter can be constructed to only transmit light at specific wavelengths. Although such an angle-specific filter may be designed to work for specific light wavelengths, such an interference filter may be used to reject the stray light coming from adjacent ridges and valleys.

The collimator filter layer 204 may also be a transparent glass collimator filter with round openings on top and bottom. This type of collimator filter layer is made using double-sided alignment technique to create top and bottom openings that are aligned, but without physically hollow holes through the glass body. The top surface of the collimator filter layer can be textured to be a diffuser for the light entering while the bottom surface can be metallic to recycle by reflecting the light back to the transparent glass body. One of the advantages is that this method makes lamination simpler since there are no physically hollow apertures. With this glass collimator filter layer, cover glass, light guide film, and glass filter can be laminated with readily available lamination equipment.

In some embodiments, an opaque glass collimator filter with drilled apertures can be used. This is similar to the previously described collimator filter film. The manufacturing method may be the same, except for the fact that the body is glass. The aperture density is determined based on the required dpi.

Figure 6:
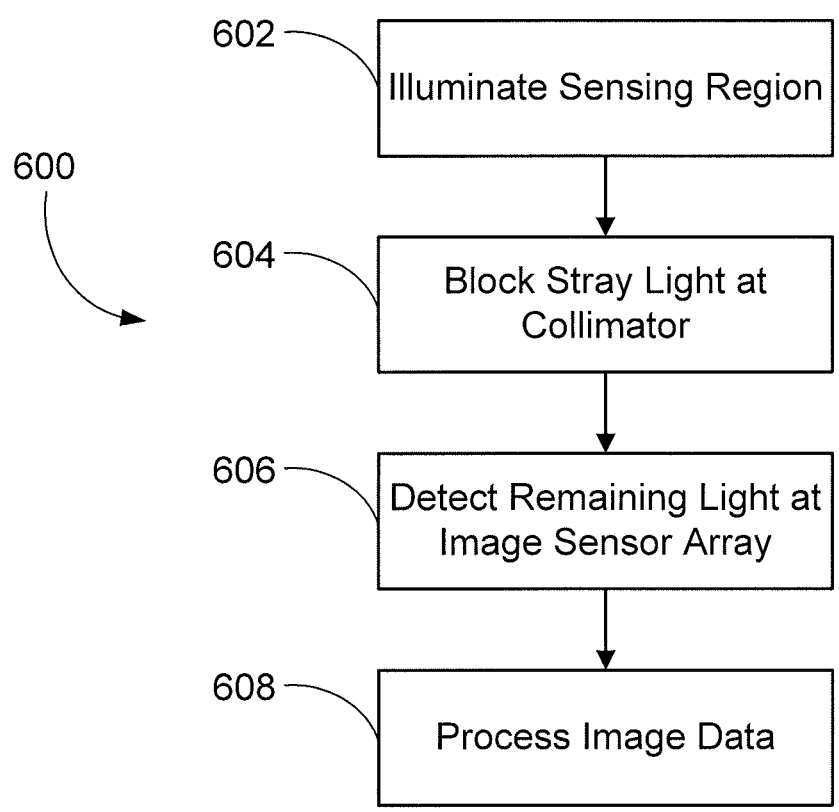
FIG. 6 illustrates a method of imaging an input object according to an embodiment of the disclosure.

FIG. 6 shows a method 600 of imaging in accordance with the present disclosure.

In step 602, the sensing region is illuminated using an illumination layer having a light source and/or light guiding element. As previously described, this may be done by using a light source directing light into a separate light guiding element or by transmitting light directly into the cover layer. The transmitted light is directed towards a sensing region above the cover layer and reflected from the object towards the light collimator layer.

In step 604 some of the reflected light is blocked at the collimator filter layer while other light passes through apertures in the collimator filter layer. Generally, light rays at relatively near normal incidence to the collimator filter layer will pass through the apertures while light rays further from normal incidence will be blocked. Light may be blocked by the top surface of the collimator layer, an intermediate layer of the collimator, a bottom layer of the collimator, or sidewalls of the collimator aperture.

In step 606, the light which passes through the collimator filter layer becomes incident on one or more optical sensing elements on the sensor array below the light collimator layer. In instances where more than one sensing element is below a particular aperture in the collimator filter layer, the detected light at the sensing elements may be averaged or otherwise combined. The image data may be adjusted to account for sensing elements that are not below an aperture.

In step 608, the detected light at the image sensor array is processed to form an image or a partial image of the input object. Such processing may include, for example, stitching partial images together, relating various partial images to one another in a template, and/or comparing captured image data to previously stored image data as part of an identification or verification process.

Although this invention describes optical object imaging in the context of fingerprint image sensing, the method and system may be used to image any object. For example, a high resolution image of a palm or hand may be acquired by placing the hand directly on the cover layer. Imaging of non-biometric objects is also with the scope of this disclosure.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An optical fingerprint sensor, comprising:
an image sensor array;
a collimator filter layer disposed above the image sensor array, the collimator filter layer having an array of apertures, wherein a ratio of a height of the apertures to a diameter of the apertures is between 3:1 and 100:1; and
an illumination layer disposed above the collimator layer, wherein the illumination layer comprises a display, the display being a light source for fingerprint imaging.

2. The optical fingerprint sensor of claim 1, wherein the image sensor array is formed in a semiconductor die.

3. The optical fingerprint sensor of claim 1, wherein the image sensor array includes a plurality of optical sensing elements, and the plurality of optical sensing elements receive light reflected from a sensing region and transmitted through an aperture of the array of apertures.

4. The optical fingerprint sensor of claim 1, wherein the ratio of the height of the apertures to the diameter of the apertures is between 5:1 and 20:1.

5. The optical fingerprint sensor of claim 1, further comprising a blocking layer disposed above the collimator filter layer, the blocking layer configured to permit transmission of non-visible light from the illumination layer and block transmission of visible light.

6. The optical fingerprint sensor of claim 1, wherein the collimator filter layer includes a top surface having a reflecting layer.

7. The optical fingerprint sensor of claim 6, wherein the reflecting layer comprises a multifaceted surface.

8. The optical fingerprint sensor of claim 7, wherein the multifaceted surface is metalized.

9. The optical fingerprint sensor of claim 1, wherein the collimator filter layer comprises a cured polymer.

10. The optical fingerprint sensor of claim 1, wherein the array of apertures have a pitch less than a pitch of ridges in a fingerprint.

11. The optical fingerprint sensor of claim 1, wherein the array apertures comprise grooved surfaces.

12. An optical fingerprint sensor, comprising:
an illumination layer, wherein the illumination layer comprises a display, the display being a light source configured to direct light to a sensing region for fingerprint imaging;
a collimating layer, disposed below the illumination layer, and including a plurality of apertures, wherein the apertures are configured to block a portion of light from the illumination layer and wherein a ratio of a height of the apertures to a diameter of the apertures is between 3:1 and 100:1; and
an image sensor layer, disposed below the collimating layer, and including an array of optical sensor elements arranged so that a plurality of the sensor elements receive light transmitted through one of the plurality of apertures.

13. The optical fingerprint sensor of claim 12, wherein the plurality of apertures have a pitch less than a pitch of ridges in a fingerprint.

14. The optical fingerprint sensor of claim 12, wherein the ratio of the height of the apertures to the diameter of the apertures is between 5:1 and 20:1.

15. The optical fingerprint sensor of claim 12, further comprising a blocking layer disposed above the collimating layer, the blocking layer configured to at least partially permit transmission of light from the illumination layer and at least partially block transmission of other light.

16. The optical fingerprint sensor of claim 15, wherein the blocking layer is opaque.

17. The optical fingerprint sensor of claim 15, wherein the blocking layer is semitransparent.

18. A method of imaging a fingerprint using a device, comprising:
transmitting, from a display, light in an illumination region such that at least a portion of light reflects from a sensing region;
blocking at least a first portion of the light reflected from the sensing region at a surface of a collimating layer; wherein the collimating layer is below the display;
blocking at least a second portion of the light reflected from the sensing region within a plurality of apertures of the collimating layer wherein a ratio of a height of the apertures to a diameter of the apertures is between 3:1 and 100:1; and
sensing, at a plurality of optical sensor elements in a sensor array, a third portion of light reflected from the sensing region, the third portion of light being passed through at least one of the plurality of apertures in the collimating layer.

19. The method of claim 18, wherein data received from the plurality of sensor elements is combined into a single pixel value.

20. The method of claim 18, further comprising eliminating data from unused optical sensing elements.

* * * * *

EX PARTE REEXAMINATION CERTIFICATE (11800th)
United States Patent
Smith et al.

(10) Number: US 9,829,614 C1
(45) Certificate Issued: Feb. 5, 2021

(54) OPTICAL SENSOR USING COLLIMATOR

(71) Applicant: Synaptics Incorporated, San Jose, CA (US)

(72) Inventors: Patrick Smith, San Jose, CA (US); Paul Wickboldt, San Jose, CA (US); Patrick A Worfolk, San Jose, CA (US); Steve Molesa, San Jose, CA (US); Young Lee, San Jose, CA (US); Richard Klenkler, San Jose, CA (US)

(73) Assignee: Will Semiconductor (Shanghai) Co. Ltd.

Reexamination Request:
No. 90/014,285, Apr. 12, 2019

Reexamination Certificate for:
Patent No.: 9,829,614
Issued: Nov. 28, 2017
Appl. No.: 14/871,810
Filed: Sep. 30, 2015

Related U.S. Application Data

(60) Provisional application No. 62/111,012, filed on Feb. 2, 2015, provisional application No. 62/111,022, filed on Feb. 2, 2015.

(51) Int. Cl.
*G06K 9/00* (2006.01)
*G02B 5/20* (2006.01)
*G02B 27/30* (2006.01)
*G02B 27/58* (2006.01)
*F21V 8/00* (2006.01)

(52) U.S. Cl.
CPC ............ *G02B 5/208* (2013.01); *G02B 5/201* (2013.01); *G02B 27/30* (2013.01); *G02B 27/58* (2013.01); *G06K 9/0004* (2013.01); *G02B 6/005* (2013.01)

(58) Field of Classification Search
None
See application file for complete search history.

(56) References Cited

To view the complete listing of prior art documents cited during the proceeding for Reexamination Control Number 90/014,285, please refer to the USPTO's public Patent Application Information Retrieval (PAIR) system under the Display References tab.

*Primary Examiner* — Yuzhen Ge

(57) ABSTRACT

Systems and methods for optical imaging are disclosed. The optical fingerprint sensor includes an image sensor array; a collimator filter layer disposed above the image sensor array, the collimator filter layer having an array of apertures; and an illumination layer disposed above the collimator filter layer. The collimator filter layer filters reflected light such that only certain of the reflected light beams reach optical sensing elements in the image sensor array. Employing the collimator filter layer prevents blurring while allowing for a lower-profile image sensor.

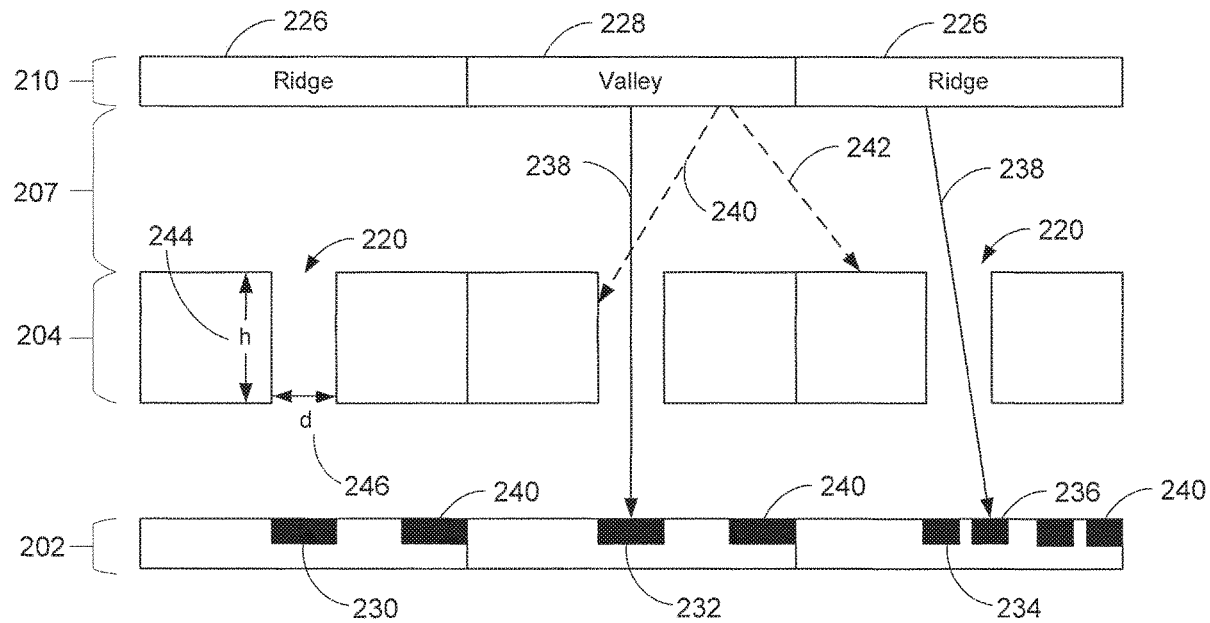

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1-18 is confirmed.

Claims 19-20 were not reexamined.

\* \* \* \* \*